United States Patent [19]

Simpson

[11] 3,866,037

[45] Feb. 11, 1975

[54] OPTICAL SYSTEMS AND ASSOCIATED DETECTING MEANS

[75] Inventor: George R. Simpson, South Woodstock, Conn.

[73] Assignee: American Optical Company, Southbridge, Mass.

[22] Filed: Nov. 22, 1957

[21] Appl. No.: 698,896

[52] U.S. Cl............... 250/216, 102/70.2, 250/203, 250/239, 250/342, 250/578, 356/4
[51] Int. Cl. ................................................ H01j 3/14
[58] Field of Search............... 88/1, 14, 78, 74, 1 M; 102/20.2, 70.2; 250/216, 220, 203, 216, 342, 578, 239; 356/4

[56] References Cited
UNITED STATES PATENTS

| | | | |
|---|---|---|---|
| 2,137,598 | 11/1938 | Vos | 102/70.2 P |
| 2,369,622 | 2/1945 | Taulson | 88/1 |
| 2,892,093 | 1/1959 | Henderson | 102/70.2 X |

FOREIGN PATENTS OR APPLICATIONS

| | | |
|---|---|---|
| 352,035 | 1/1931 | Great Britain |
| 585,792 | 2/1947 | Great Britain |
| 1,042,722 | 1/1953 | France |

Primary Examiner—Benjamin A. Borchelt
Assistant Examiner—H. J. Tudor
Attorney, Agent, or Firm—H. R. Berkenstock, Jr.; William C. Nealon

EXEMPLARY CLAIM

1. An opaque main supporting housing and a light-collecting and detecting system disposed within said supporting housing and intermediate the spaced opposite ends thereof, said housing surrounding said light-collecting and detecting system and said system being arranged to simultaneously view through light apertures in side wall portions of said housing all parts of a first and a second predetermined generally conically-shaped endless annular object field outwardly of said housing and in concentric relation to a central longitudinal axis of said housing, said system comprising a single photosensitive detecting element for detecting any appreciable change in light intensity which occurs in any part of either object field, said detecting element being of relatively small predetermined size and disposed at a fixed location in said housing and upon said longitudinal axis, a first group and a second group of similar light apertures arranged in longitudinally spaced relation to each other in side wall portions of said housing, and the light apertures of each group being arranged in circumferentially spaced relation, each light aperture being of relatively small dimensions both in the longitudinal and circumferential directions thereof, and separated from adjacent apertures of the same group by side wall portions of said housing of appreciably greater circumferential dimension, the light apertures of said first group being arranged to face outwardly at a first predetermined look angle relative to said longitudinal axis toward different predetermined sectors, respectively, of said first object field, and the light apertures of said second group being arranged to face outwardly at a second predetermined look angle relative to said longitudinal axis toward different predetermined sectors, respectively, of said second object field, each light aperture of each group being of such a shape as to admit into the interior of said housing light from all parts of the predetermined sector aligned therewith, the circumferential spacing between adjacent apertures of each group and the angular field of view of each aperture of the same group being so related as to allow all of the apertures of the same group to jointly simultaneously admit into said housing light from all parts of the endless annular object field aligned therewith, said light-collecting and detecting system also comprising optical means for receiving and directing the light energy which enters said housing through said apertures from all azimuths of all sectors of both endless annular object fields onto said photosensitive detecting element, said optical means comprising a first plurality and a second plurality of unitary optical systems, with each unitary optical system of said first plurality optically aligned with a different respective light aperture of said first group and with said detecting element, and with each unitary optical system of said second plurality optically aligned with a different respective light aperture of said second group and with said detecting element, and each of said unitary optical systems being disposed in said housing so as to focus upon said detecting element and form a real image of said detecting element at the plane of the light aperture aligned therewith, each optical system comprising a plurality of optical components having spaced optical surfaces thereon including a first optical surface for collecting substantially all of the light from the object field which enters the light aperture aligned therewith and for directing substantially all of the light so collected toward a second optical surface on said components, said second optical surface being a positive surface for receiving substantially all of said light and directing same as a focused beam onto said single photosensitive detecting element.

8 Claims, 8 Drawing Figures

INVENTOR
GEORGE R. SIMPSON
BY
Louis L. Gagnon
Noble J. Williams
ATTORNEYS

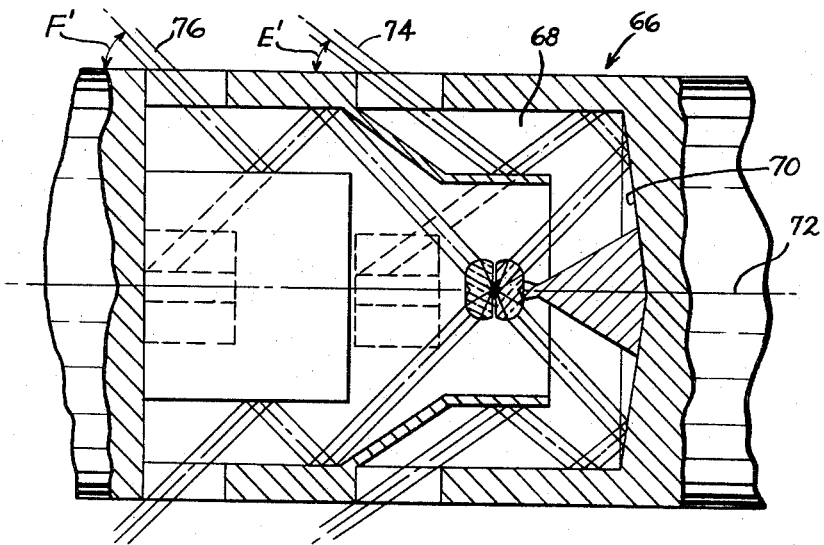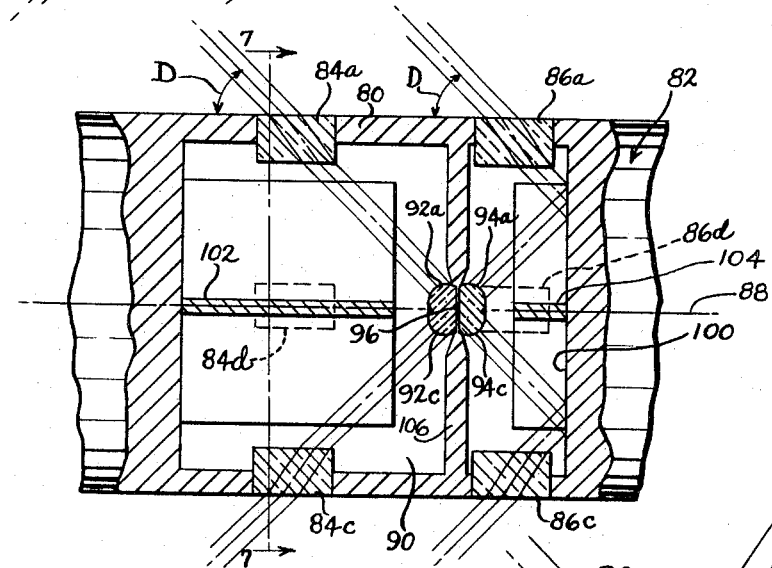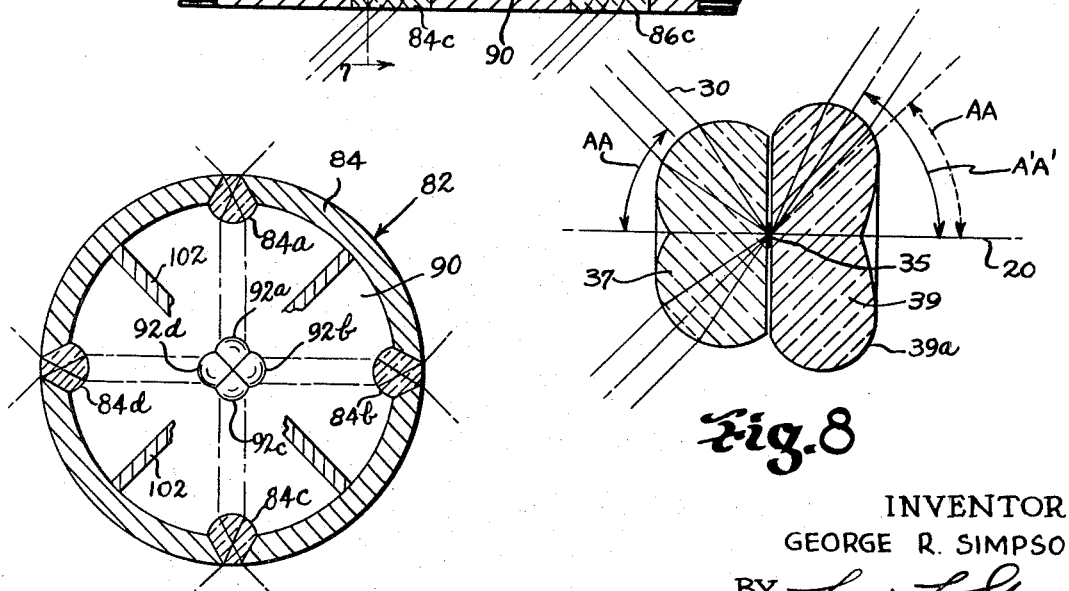

OPTICAL SYSTEMS AND ASSOCIATED DETECTING MEANS

This invention relates to a combined optical system and associated detecting means. More particularly, the invention relates to a circumferential viewing system comprising a plurality of generally similar optical systems positioned within a main supporting housing or body and arranged to simultaneously "view," through a like number of relatively small light apertures peripherally arranged in wall portions of said housing, one or more endless annular object fields surrounding said housing, or surrounding a preselected axis extending outwardly from said housing; said optical systems being constructed and arranged to function in closely nested relation to each other and simultaneously focus said light apertures upon a single suitable radiant energy detector in such a manner that any material change in light coming from any location in either of said fields and travelling toward said housing will be sensed by said single detector. (When the word "light" appears in the description which follows, it is used in its broad sense and is intended to include not only visible light but radiations at other frequencies such as infra-red and ultra-violet radiation as well).

In certain instances, it is highly desirable to be able to detect changes in radiation as they occur at any location or azimuth angle within one or more predetermined 360° endless annular object fields surrounding a housing, or surrounding a certain axis extending outwardly therefrom. In a co-pending application entitled Improvements in Optical Systems and Associated Detecting Means, Ser. No. 685,062, filed Sept. 18, 1957, in the name of George R. Simpson and Stephen M. MacNeille, there is disclosed a combined optical system which is constructed and arranged to "view" light changes in a single 360° endless annular object field and to simultaneously cause said light changes to be directed to a single suitable radiant energy detector in such a manner that any material change in light coming from any location in said annular field and travelling toward said housing will be sensed by said detector.

Said co-pending application also discloses a system for simultaneously "viewing" more than one 360° endless annular object field by employing the use of a combined optical system and radiant energy detector for each of the fields to be "viewed" thereby. While this latter arrangement has numerous adaptations, it is essential in at least one important use thereof that the individual detectors thereof be completely balanced in a way to function together in a sensitive electronic response system coupled therewith. The balancing of the detectors presents a serious problem since it is extremely difficult and expensive to make a plurality of such detectors with substantially identical optical and photo-electric response characteristics. Consequently a complete balancing of these detectors could not always be obtained and maintained.

Another major factor experienced in connection with devices of the above general type has been the need for simple and inexpensive means for increasing the intensity of light impinging upon the radiant energy detectors thereof from any particular part of the object field being "viewed" so as to increase the sensitivity and overall efficiency of the device.

Accordingly, a principal object of the present invention is to provide in the side wall portions of a main supporting housing, or the like, a plurality of peripherally spaced small light apertures and a plurality of optical systems associated therewith in such a manner as to simultaneously and jointly optically view or examine all parts of one or more endless annular object fields surrounding said housing, or surrounding a predetermined axis extending outwardly from said housing, as well as a single small detecting element operatively associated therewith; said optical systems being adapted to simultaneously focus the several light apertures upon a common image area, and said single detecting element being located at said image area and adapted to respond to any appreciable change in radiation from points within said one or more annular object fields.

An additional object is to provide in an apparatus of the above character, a single radiant energy detecting means and associated optical viewing means of the character described for simultaneous viewing or examining a plurality of differently angularly disposed 360° endless annular object fields to cause said single detecting means to simultaneously sense material changes in light directed thereto from one or more of said fields.

Another object is to provide an improved viewing and detection device of the above character embodying a single radiant energy detecting means and associated optical means so constructed and arranged and associated therewith as to simultaneously direct light from any single location in a single 360° endless annular object field to said single detecting means along a plurality of different optical paths, whereby the total amount of light collectively received by said detecting means will be increased in accordance with the number of paths provided and the effectiveness of said detecting means will likewise be increased.

It is also an object of the invention to provide a viewing and detecting system comprising a plurality of optical systems which are to a large degree free from absorptive refractive optical components and so related to each other as to provide a complete and simultaneous viewing of any or all parts of a single endless annular object field by means of different optical paths to thereby increase the response characteristics of the system, or view a plurality of different object fields of the type disclosed and to detect any radiant energy changes therein by means of a single small detecting element.

It is another object of the invention to provide in an optical viewing and detecting system of the character described and employing optical and photoelectric detecting means, additional simple reflective and refracting means whereby another annular object field may be viewed or examined and which latter field may be in any predetermined angular relation desired within a relatively wide range, relative to said first endless annular object field.

A still further object is to provide an optical viewing and radiant energy detecting system employing two differently angularly related optical systems and a single radiant energy detecting means adapted to simultaneously view two different endless annular object fields and successively detect radiant energy changes occurring therein, whereby relative movement between said system and an object or objects passing through said object fields may be detected by said single detecting means.

Other objects and advantages of the invention will become apparent from the detailed description which follows when taken in conjunction with the accompanying drawings, in which:

FIG. 5 is a view of a further modification of the invention which is generally similar in character and function to the apparatus of FIG. 4;

FIG. 6 is a fragmentary longitudinal view showing a still further modified form of the invention;

FIG. 7 is a cross-sectional view taken substantially on line 7—7 of FIG. 6 and looking in the direction of the arrows with portions thereof broken away; and FIG. 8 is a cross-sectional view of a modification of the invention.

Figure 1:
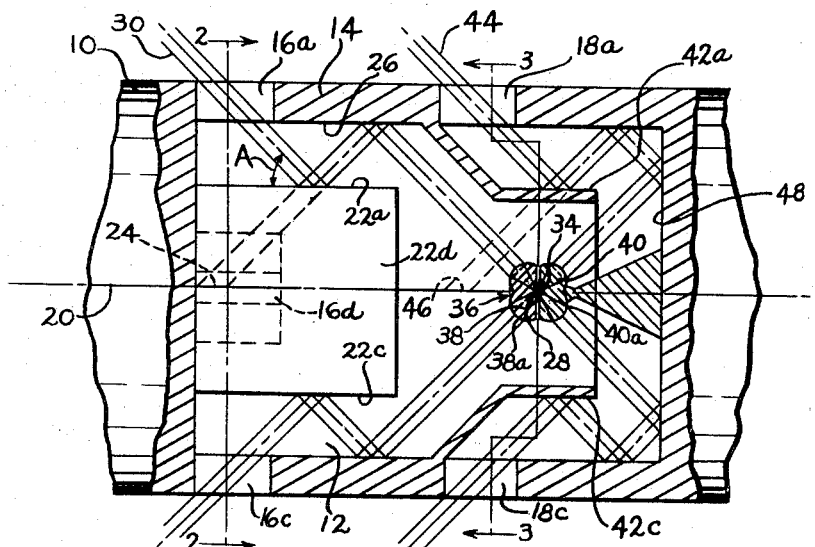
FIG. 1 is a diagrammatic longitudinal sectional view of a main supporting housing or body embodying the present invention, said view being taken substantially upon a longitudinal central axis thereof and showing optical components and photoelectric detecting means associated therewith.

Referring to the drawings in which like characters of reference designate like parts throughout the several views, there is shown in FIG. 1 an elongated cylindrically shaped main supporting housing or body of a vehicle, missile or the like which is generally indicated by the numeral 10. Located intermediate its opposite ends is a chamber 12 surrounded by side walls 14 of said body. In these side wall portions 14 is located two groups of peripherally spaced light apertures of slots of relatively small size and each of said groups of slots are differently longitudinally disposed in the side walls 14 of the housing. That is, one group of apertures is located so as to communicate with the chamber 12 of the body 10 at a location adjacent one end wall of said chamber and the other group of apertures is located so as to communicate with the chamber 12 at a predetermined axial distance from said first mentioned group. Each of the groups of apertures are adapted to simultaneously admit light from all parts of a predetermined annular conically shaped object field surrounding body 10. In this respect it can be seen from inspection of FIGS. 1, 2 and 3 that four such light apertures 16a, 16b, 16c and 16d comprise one group and four other similar light apertures 18a, 18b, 18c and 18d comprise the other group. Each of the light apertures of a particular group are equally radially spaced from a central longitudinal axis 20 of the body 10. While each group of apertures is shown as consisting of four in number, it will become apparent from the description to follow that the number is not critical as long as three or more are used and arranged to collectively completely view a 360° field. From a practical standpoint, however, ordinarily four or more would be preferred.

Each aperture, even though small, is relatively long in comparison to its width and extends in a direction parallel to the central axis 20. The exact size of the apertures will be dealt with more fully hereinafter. Within chamber 12 and disposed to face radially outwardly and to be in line with light entering the chamber through apertures 16a, 16b, 16c and 16d at a preselected sensing angle A relative to axis 20, is a plurality of plane mirrors or specularly reflecting surfaces, 22a, 22b, 22c and 22d, and each of these plane mirrors or reflecting surfaces is carefully disposed in such a manner as to lie in a plane parallel to axis 20 while being disposed half-way between that part of the side wall 14 defining the associated light aperture and the longitudinal axis 20. Thus, each plane mirror or reflector will form a virtual image of the particular light aperture associated therewith at a location on axis 20 indicated at 24.

The cylindrical side wall portion 26 of chamber 12 is preferably accurately formed and finished so as to reflect light received thereby and is of circular cross-section in concentric relation with axis 20. Thus, since the virtual images of the four light apertures are in substantial coincidence at the axis 20, the mirror-like cylindrical surface 26 will form four real images of these virtual images at unit magnification at the axial location indicated by numeral 28.

It will be seen that a bundle of light rays 30 has been indicated in FIG. 1 obliquely entering one of said light apertures 16a and as being reflected obliquely by the adjacent aligned plane reflecting surface 22a toward surface 26. As also indicated in FIG. 1, this bundle will thereafter be reflected by wall 26 generally toward a preselected axial location 28. However, from inspection of FIG. 2, it will be seen that while an angular field of 90° has been indicated at B adjacent aperture 16a, the bundle 30 has been indicated as light coming from a location within this object field and entering the aperture obliquely.

It will be seen that this small bundle of light rays, (which may be considered representative of any selected small bundle within the angular field B), after passing through aperture 16a, will impinge upon the plane mirror surface 22a in a sloping direction indicated by angle C. Nevertheless, each ray of the bundle of rays (which rays are substantially parallel to one another) will be thereafter reflected by surface 22a at an angle of reflection equal to the angle of incidence. Thus, while the central rays of the bundle are reflected outwardly in a radial plane 32 and will be thereafter reflected back in this radial plane 32 toward axis 20, the outermost light rays of the bundle will be converged when reflected by the surface 24 so as to cross each other substantially half-way between surface 26 and axis 20.

Substantially at the axial location 28 is located a relatively small energy detecting element 34 having both of its side surfaces sensitive to light and in order to concentrate light rays, such as the bundle 30, to be received thereby, there is provided a refracting means 36. The refracting means 36 comprises a pair of substantially identical optical elements 38 and 40 laminated or otherwise connected together in back-to-back relation with each other with the radiant energy detecting element 34 disposed centrally therebetween. Each of the optical elements 38 and 40 is, as clearly indicated in FIGS. 2 and 3, a figure of revolution having an annular refracting surface which is of such a shape that when any radial plane extending from the axis 20 is considered, such as in FIG. 1, there will be disclosed refracting surfaces 38a and 40a respectively which are of such controlled curvature as to tend to refract light rays impinging thereon toward detecting element 34. On the other hand, when the refracting means 36 is considered in the transverse direction shown in FIGS. 2 and 3, it will be evident that the annular curvature of the surfaces 38a and 40a will also tend to cause the light rays of bundle 30 to be refracted inwardly toward the small centrally disposed detecting element 34.

The optical element 38 of the refracting means 36 is adapted to receive light rays from the group of apertures 16a, 16b, 16c and 16d and refract said light rays toward detecting element 34 while optical element 40 is adapted to simultaneously receive light rays from the group of apertures 18a, 18b, 18c and 18d and also refract said light rays toward detecting element 34 in a manner to be described in detail hereinafter.

Since four separate similar reflecting and refracting systems are provided in association with the group of apertures 16a, 16b, 16c and 16d and each covers a 90° field of view and the positive refracting component or optical element 38 serves to combine same into a composite system for directing all light received thereby onto the single detector 34, it should be clear that all parts of a 360° object field of hollow conical shape will be viewed simultaneously by the combined system. Since the optical element 38 and the plane reflecting surfaces 22a–22d and cylindrical surface 26 are so related to each other that an image of the small detecting element 34 will be formed substantially at each light aperture 16a–16d, in theory each aperture need be no wider than the width of the detecting element image formed adjacent each light aperture. In practive, however, an aperture of twice this width might be preferred. Nevertheless, it would still be of narrow width.

Figure 2:
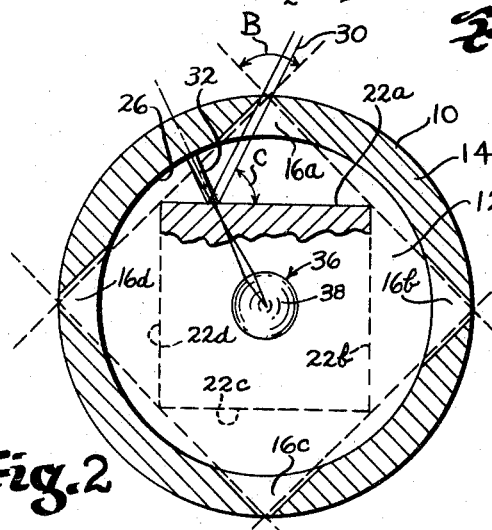
FIG. 2 is a cross-sectional view taken substantially on line 2—2 of FIG. 1, and looking in the direction of the arrows.
Figure 3:
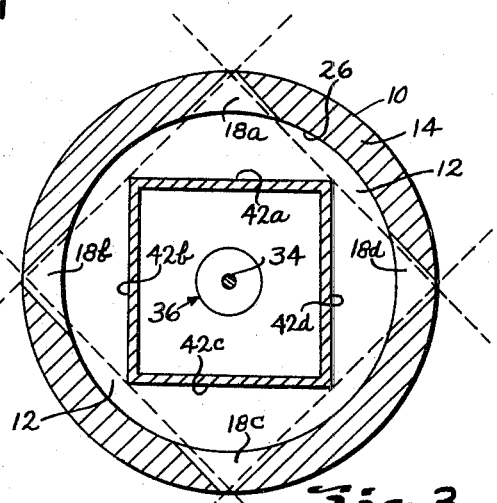
FIG. 3 is a cross-sectional view similar to FIG. 2 but taken on line 3—3 of FIG. 1, and looking in the direction of the arrows.

In order to materially increase the intensity of the light received by the single detector 34 from the above mentioned 360° object field and thus increase the sensitivity and overall efficiency of the device of FIGS. 1 through 3, four additional reflecting and refracting systems are provided within the chamber 12 of body 10 to direct light rays entering the group of apertures 18a, 18b, 18c and 18d from the object field to the element 40 of the refracting means 36 which in turn also impinges said light upon the single detector 34.

The reflecting and refracting systems associated with apertures 18a, 18b, 18c and 18d embody a plurality of plane mirrors or specularly reflecting surfaces 42a, 42b, 42c and 42d each of which is carefully disposed to lie in a plane parallel to axis 20 of the body 10 while being half-way between that part of the side wall 14 defining the associated light aperture and the longitudinal axis 20. Each of the mirrors 42a–42d will function in a manner identical to the mirrors 22a–22d described above. Thus, a bundle of light rays 44 entering one of the light apertures 18a will form a virtual image of the particular aperture associated therewith at a location on axis 20 indicated at 46. The light rays 44, however, will be reflected by the adjacent reflecting surface 42a toward surface 26. The end wall 48 of chamber 12 is provided with a plane mirror or specular surface which is disposed in a plane substantially normal to the direction of the axis 20 so as to direct the light rays 44 from surface 26 to the axial location 28 at which point is located the detecting element 34. The optical element 40 of the refracting means 36 will, as discussed previously, refract the light rays impinging thereon toward detecting element 34.

It can then be seen that with the reflecting surface 48, four separate similar reflecting and refracting systems are provided in association with the group of apertures 18a–18d each covering a 90° field of view and the refracting element 40 serves to combine the same into a composite system for directing all the light received thereby onto the single detector 34 and with the reflecting surface 48 being flat and disposed in a plane normal to the axis 20, all parts of the same 360° object field as viewed through the apertures 16a–16d will be simultaneously viewed by the same single radiant energy detector 34.

It is to be understood that the reflecting and refracting systems associated with the group of apertures 16a–16d or the reflecting and refracting systems associated with apertures 18a–18d could be used alone and separately to view the entire 360° object field mentioned above. However, by the combined use of the two groups of apertures and their associated systems, the intensity of the light received from said 360° object field at the single radiant energy detector 34 will be susbtantially doubled.

In the construction used in FIG. 1, the material forming the elements 38 and 40 of the refracting means 36 which is employed for concentrating the light rays impinging thereon should be selected with care in accordance with the particular type of radiation to be "viewed" by the system. Also, the material forming the radiant energy detector 34 would be selected in accordance with the type of radiation to be detected. For example, while a suitable crown or flint glass or an equivalent glass or colorless transparent plastic medium might be employed in the formation of the refracting means 36 if only radiation in a visible region of the spectrum is to be detected, on the other hand, if, for example, infra-red radiation is of particular interest, it might be that a different material, an infra-red transmitting plastic or glass would be required for forming the refracting element. Also of importance is the refractive index of the element, a high index being preferable, since when the detecting material 34 is deposited so as to be in optical contact with the optical elements 38 and 40 a numerical aperture as high as the refractive index of the elements 38 and 40 may be obtained.

It may be desirable at times to simultaneously view two object fields which are differently angularly related to the axis of the main supporting body. This may be accomplished with the use of a single radiant energy detector 35 positioned at the same axial location 28 but having differently configurated optical elements 37 and 39 at opposite sides of detector 35 in the manner illustrated in FIG. 8. For example, if the optical element 37 is identical to the element 38 described above, the sensing angle AA in FIG. 8 will be identical to angle A of light rays 30, FIG. 1, and the light rays entering element 37 will follow the same path illustrated in FIG. 1 with respect to optical element 38. However, by altering the shape of element 39 in the manner illustrated in FIG. 8 so as to cause its refracting surface 39a to direct light coming from a different angular direction A'A' to the detector 35 relative to axis 20, it can be seen that a different annular object field can be simultaneously sensed or viewed by detector 35 provided that the light apertures 18a–18d are suitably located to admit this light. That is, the sensing angle of the light rays entering apertures 18a–18d would, in this case, be likewise altered somewhat so as to be equal to angle A'A' although these rays enter apertures 18a–18d from nearly the same general direction as indicated in FIG. 1. This is due to the fact that said light rays are folded 90° by the plane reflecting surface 48 the same as in the modification shown in FIG. 1.

Figure 4:
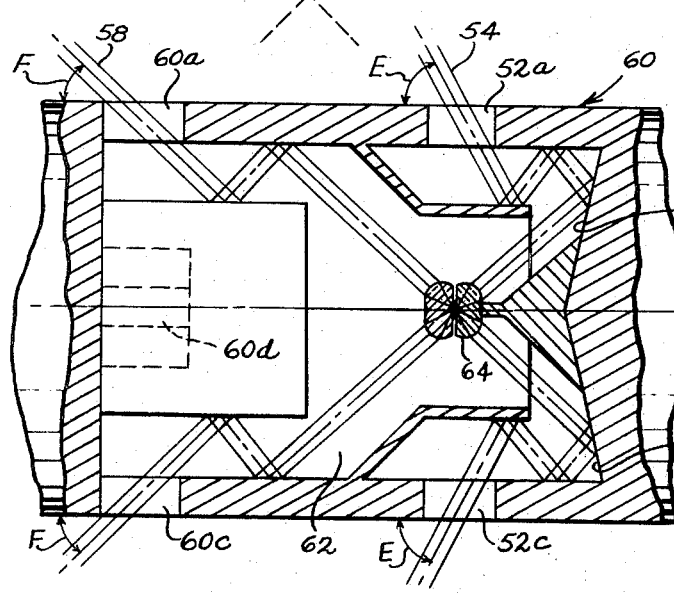
FIG. 4 is a fragmentary longitudinal view showing an alternative form of the invention and embodying a single radiant energy detecting means and associated optical means which may be used for simultaneously viewing two annular object fields.

FIGS. 4 and 5 illustrate further modification of the invention wherein means is provided for simultaneously viewing two object fields which are differently angularly related to the axis of the main supporting body. A material difference between the apparatus of FIG. 1 and that of either of the FIGS. 4 or 5 resides in the fact that the end wall of chamber 12 nearest the radiant energy detector is differently shaped and disposed relative to the longitudinal axis of the apparatus so that differently conically shaped object fields will be simultaneously viewed by the single radiant energy detector through each of the two groups of apertures in the side wall. For example, in FIG. 4, the mentioned end wall thereof is provided with a conically shaped mirror or reflecting surface 50 which is radially symmetrical about the central axis 56 of the housing or body 60. The reflecting surface 50 is so disposed and associated with each of the respective apertures 52a–52c as to direct light rays 54 entering apertures 52a–52c from a different predetermined angular value E from the central axis 56 than the predetermined angular value F of the light rays 58 entering apertures 60a–60d. Thus, if the housing or body 60 is travelling in the direction of axis 56 and this travel causes an object spaced from the axis 56 to pass through the conical field established by the viewing system within the end of chamber 62 adjacent the surface 50 (and arranged for example, at a 50° angular value relative to the axis 56), and then causes the object to pass through the second conical field established by the viewing system in the opposite end of chamber 62 (and having for example, an angular value of 60° relative to axis 56) these two conical fields would be intercepted by the object at different moments. Accordingly the single detecting means 64 associated with the two systems would detect such interruptions at spaced intervals and this information might be recorded or otherwise used by suitable electronic equipment operatively associated with said detecting means. It is particularly pointed out that only a single radiant energy detecting means is used to receive the light energy from both of the mentioned object fields regardless of their angular displacement relative to each other. To further illustrate this point, FIG. 5 has shown a housing or body 66 having a chamber 68 with one of its end walls having a concave conically shaped reflective surface 70 which is radially symmetrical about a central longitudinal axis 72 of the body 66 and disposed at a different angle relative to axis 72 than the surface 50 of FIG. 4. With the arrangement shown in FIG. 5 it is evident that the angular relationship of the angles E' of light rays 74 and F' of light rays 76 will be such as to cause the respective conical object fields to be in intersecting relation with each other. By properly angularly disposing the surface 50 of FIG. 4 or surface 70 of FIG. 5, many combinations of angularly disposed object fields to be viewed by the single detecting element may be achieved in devices of the character just described. It is to be understood that the combined use of conical reflecting surfaces such as shown in FIGS. 4 and 5 and differently configurated refracting elements such as illustrated in FIG. 8 may also be employed to simultaneously view two different object fields in the above described manner.

In FIGS. 6 and 7 there is shown a further modified form of the invention wherein instead of employing combinations of reflecting and refracting elements or components for the separate parts of the combined optical system, as in FIGS. 1–5, this modified construction embodies a main housing or body 82 having a side wall 80 with one group of equally spaced peripherally located light apertures each having an elongated convergent lens element 84a, 84b, 84c and 84d therein and a second group of similarly spaced and peripherally located light apertures longitudinally disposed in spaced relation to said first group on said body 82 and each having a convergent lens element 86a, 86b, 86c and 86d therein. The lens elements 84a–84d and 86a–86d are each positioned with their longest dimension parallel to a central longitudinal axis 88 of the body 82 and would preferably have a plane outer surface with a suitably curved inner surface so as to refract the light entering its respective aperture from a 90° field, FIG. 7, and at a sloping angle D as shown in FIG. 6.

Arranged within a chamber 90 within the body 82 are a plurality of closely grouped centrally located convergent refracting optical elements. Refracting elements 92a, 92b, 92c and 92d are adapted to function with lens elements 84a–84d respectively and refracting elements 94a, 94b, 94c and 94d are adapted to function in conjunction with lens elements 86a–86d respectively. Each of the refracting elements 92a–92d are closely nested together as are the refracting elements 94a–94d and the two groups formed thereby are laminated or otherwise fitted together in back-to-back relation with each other and a radiant energy detecting means 96 is disposed between said two groups of refracting elements so as to lie on axis 88 of the body 82. The individual refracting elements 92a–92d and 94a–94d may be each formed as a single unit by conventional moulding or casting operations and cemented together or formed as a single unit. In either event, it is desirable to provide a good optical contact between the radiant energy detecting means and the refracting material so that a high numerical aperture will be obtained.

Each respective pair of inner and outer optical elements of components, for example, 84a and 92a, is of such optical design that the outer element (see 84a) will view a 90° sector of an annular object field disposed at the sloping angle D relative to axis 88 and will refract the light so received into a parallel beam directed toward the inner element (see 92a) disposed adjacent the axis 88. Thus, the four similar pairs of refracting components together will completely cover a conically shaped hollow annular object field which is in concentric relation with the longitudinal axis 88. In a similar manner the group of outer elements 86a–86d will function in conjunction with their respective inner elements 94a–94d to also completely cover the same annular object field which is disposed likewise at angle D relative to the axis 88. In order to cause the parallel beams of light from elements 86a–86d to be directed to elements 94a–94d respectively, the end wall 100 of the chamber 90 is provided with a reflecting surface lying in a plane substantially normal to axis 88. Thus, parallel light from any part of any of the four 90° sectors and transmitted by any one of the elements 86a–86d will be reflected by end wall 100 toward the inner elements 94a–94d. It is to be understood that the single radiant energy detector 96, in the present instance, will function in a manner similar to the above described detector 34, FIG. 1, in simultaneously receiving light energy from any or all of the above mentioned associated optical systems. While one group of inner and outer optical refracting elements would provide means for scanning the entire annular object field mentioned above, it can be seen that by the use of the two groups of inner and outer optical refracting elements as described, the intensity of the light received from a single object field by the detecting element 96 will be substantially doubled.

In order that no radiant energy from an undesired direction may enter the chamber 90 and be improperly reflected from the interior walls thereof, crossed baffles 102 and 104 may be used in conjunction with the groups of refracting elements 84a–84d and 86a–86d respectively. The baffles would be treated with a light absorbing paint, or the like, and if desired, all of the interior of the chamber 90, except for wall 100, could be likewise treated for light absorption. If desired a centrally apertured opaque transverse partition 106 may be used to divide the chamber 90 into two parts, a front part and rear part, so that no light in one part may travel into the other. At the same time the partition may serve as supporting means for the inner refracting elements secured in back-to-back relation.

It is pointed out that the end wall 100 of the device of FIG. 6 could be conically modified in accordance with the teachings of FIGS. 4 and 5 so as to adapt the device for simultaneous scanning or viewing the two differently angularly related annular object fields with the use of a single radiant energy detector. In such a case, of course, the two inner refracting elements would have the refracting surfaces arranged to face in slightly different directions so as to properly accept the light directed thereon by the outer elements in the wall of the housing.

It is also to be understood that a number of combined optical systems of the character described above could be located in the body of a vehicle, missile or the like if desired to provide a scanning or viewing of several different object fields.

From the foregoing, it can be seen that simple and efficient means have been provided for accomplishing all the objects and advantages of the invention. However, it is to be understood that various omissions, substitutions and changes in the forms and details of the embodiments illustrated may be made by those skilled in the art without departing from the spirit of the invention as expressed in the accompanying claims. The invention, therefore, is not limited to the exact matters shown and described, as only the preferred forms have been given by way of illustration.

Having described my invention, I claim:

1. An opaque main supporting housing and a light-collecting and detecting system disposed within said supporting housing and intermediate the spaced opposite ends thereof, said housing surrounding said light-collecting and detecting system and said system being arranged to simultaneously view through light apertures in side wall portions of said housing all parts of a first and a second predetermined generally conically shaped endless annular object field outwardly of said housing and in concentric relation to a central longitudinal axis of said housing, said system comprising a single photosensitive detecting element for detecting any appreciable change in light intensity which occurs in any part of either object field, said detecting element being of relatively small predetermined size and disposed at a fixed location in said housing and upon said longitudinal axis, a first group and a second group of similar light apertures arranged in longitudinally spaced relation to each other in side wall portions of said housing, and the light apertures of each group being arranged in circumferentially spaced relation, each light aperture being of relatively small dimensions both in the longitudinal and circumferential directions thereof, and separated from adjacent apertures of the same group by side wall portions of said housing of appreciably greater circumferential dimension, the light apertures of said first group being arranged to face outwardly at a first predetermined look angle relative to said longitudinal axis toward different predetermined sectors, respectively, of said first object field, and the light apertures of said second group being arranged to face outwardly at a second predetermined look angle relative to said longitudinal axis toward different predetermined sectors, respectively, of said second object field, each light aperture of each group being of such a shape as to admit into the interior of said housing light from all parts of the predetermined sector aligned therewith, the circumferential spacing between adjacent apertures of each group and the angular field of view of each aperture of the same group being so related as to allow all of the apertures of the same group to jointly simultaneously admit into said housing light from all parts of the endless annular object field aligned therewith, said light-collecting and detecting system also comprising optical means for receiving and directing the light energy which enters said housing through said apertures from all azimuths of all sectors of both endless annular object fields onto said photosensitive detecting element, said optical means comprising a first plurality and a second plurality of unitary optical systems, with each unitary optical system of said first plurality optically aligned with a different respective light aperture of said first group and with said detecting element, and with each unitary optical system of said second plurality optically aligned with a different respective light aperture of said second group and with said detecting element, and each of said unitary optical systems being disposed in said housing so as to focus upon said detecting element and form a real image of said detecting element at the plane of the light aperture aligned therewith, each optical system comprising a plurality of optical components having spaced optical surfaces thereon including a first optical surface for collecting substantially all of the light from the object field which enters the light aperture aligned therewith and for directing substantially all of the light so collected toward a second optical surface on said components, said second optical surface being a positive surface for receiving substantially all of said light and directing same as a focused beam onto said single photosensitive detecting element.

2. The combination as set forth in claim 1 and wherein said first and second predetermined look angles face in the same general direction and are of substantially equal angular values, whereby said first and second annular object fields are disposed in substantially coincident relation to each other.

3. The combination as set forth in claim 1 and wherein said first and second predetermined look angles are of different angular values so that all parts of said first and second annular object fields of different conical shapes may be simultaneously viewed by said collecting and detecting system.

4. The combination as set forth in claim 1 and wherein the unitary optical systems aligned with said first group of apertures and with said second group of apertures for receiving light from said first and second object fields, respectively, are disposed so as to simultaneously direct the light transmitted thereby onto opposite faces of said single photosensitive detecting element.

5. The combination as set forth in claim 1 and wherein the plurality of optical components providing said spaced optical surfaces of each unitary optical system are positive refracting optical components in optically aligned relation to each other.

6. The combination as set forth in claim 1 and wherein the plurality of optical components providing said spaced optical surfaces of each unitary optical system are spaced reflecting components, including at least one positive reflecting component, in optically aligned relation to each other.

7. The combination as set forth in claim 1 and wherein the plurality of optical components providing said spaced optical surfaces of each unitary optical system include at least one reflecting and one refracting component, and one of said optical surfaces being a positive surface for directing said light as a convergent beam onto said single photosensitive detecting element.

8. The combination as set forth in claim 1 and wherein the unitary optical systems aligned with said first group of apertures and with said second group of apertures for receiving light from said first and second object fields, respectively, are disposed so as to direct the light transmitted thereby onto opposite faces of said single photosensitive detecting element, and each of said unitary optical systems comprise a pair of reflecting components one of which is flat and the other of which is curved so as to converge the light, and a positive refracting component adjacent said detecting element and in optical contact with a face thereof.

* * * * *